United States Patent
Dockemeyer, Jr. et al.

(10) Patent No.: US 7,609,203 B2
(45) Date of Patent: Oct. 27, 2009

(54) METHOD FOR EPHEMERIS ASSISTED GLOBAL POSITIONING

(75) Inventors: Joseph R. Dockemeyer, Jr., Kokomo, IN (US); Larry J. Fruit, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 11/300,220

(22) Filed: Dec. 14, 2005

(65) Prior Publication Data

US 2007/0132635 A1 Jun. 14, 2007

(51) Int. Cl.
*G01S 1/00* (2006.01)
(52) U.S. Cl. .................................. 342/357.09
(58) Field of Classification Search ....... 342/357.01–17
See application file for complete search history.

(56) References Cited

U.S. PATENT DOCUMENTS

| | | | | |
|---|---|---|---|---|
| 6,385,532 B1 * | 5/2002 | Dance et al. | ................. | 701/207 |
| 6,549,846 B1 * | 4/2003 | Dance et al. | ................. | 701/207 |
| 6,909,361 B2 * | 6/2005 | McCarthy et al. | ........ | 340/425.5 |
| 6,973,384 B2 * | 12/2005 | Zhao et al. | .................. | 701/117 |
| 7,274,906 B1 * | 9/2007 | Nguyen et al. | ............. | 455/3.05 |
| 2004/0119638 A1 * | 6/2004 | Fagan et al. | ............ | 342/357.03 |
| 2004/0230374 A1 * | 11/2004 | Tzamaloukas | ............... | 701/217 |
| 2005/0085257 A1 * | 4/2005 | Laird et al. | ............... | 455/550.1 |
| 2005/0273252 A1 * | 12/2005 | Nix et al. | ..................... | 701/201 |
| 2006/0017611 A1 * | 1/2006 | Hatch et al. | ............ | 342/357.03 |
| 2006/0036365 A1 * | 2/2006 | Chiayee et al. | ............. | 701/213 |
| 2006/0046749 A1 * | 3/2006 | Pomerantz et al. | .......... | 455/457 |
| 2006/0063559 A1 * | 3/2006 | Fruit et al. | ............... | 455/552.1 |
| 2007/0040740 A1 * | 2/2007 | Abraham et al. | ....... | 342/357.12 |
| 2008/0129591 A1 * | 6/2008 | Lamance et al. | ....... | 342/357.12 |

* cited by examiner

*Primary Examiner*—Thomas H Tarcza
*Assistant Examiner*—Harry Liu
(74) *Attorney, Agent, or Firm*—Jimmy L. Funke

(57) ABSTRACT

The present invention generally relates to the transmission of GPS reference information, and more particularly, to transmission of GPS ephemeris information for mobile applications. A Telemetry word data is provided by and/or transmitted by a non-cellular, land based network and received by a receiver. A location signal is computed by a processor and transmitted to the GPS receiver. An accumulator accumulates that data and stores it in a data base. The unit may be connected to a Public Safety Answering Point. Also, the present invention provides a method to assist the GPS in mobile applications where the user does not necessarily have a cellular phone. The present invention discloses a method of transmitting ephemeris data to assist the GPS receiver without relying on the cellular telephone network.

36 Claims, 3 Drawing Sheets

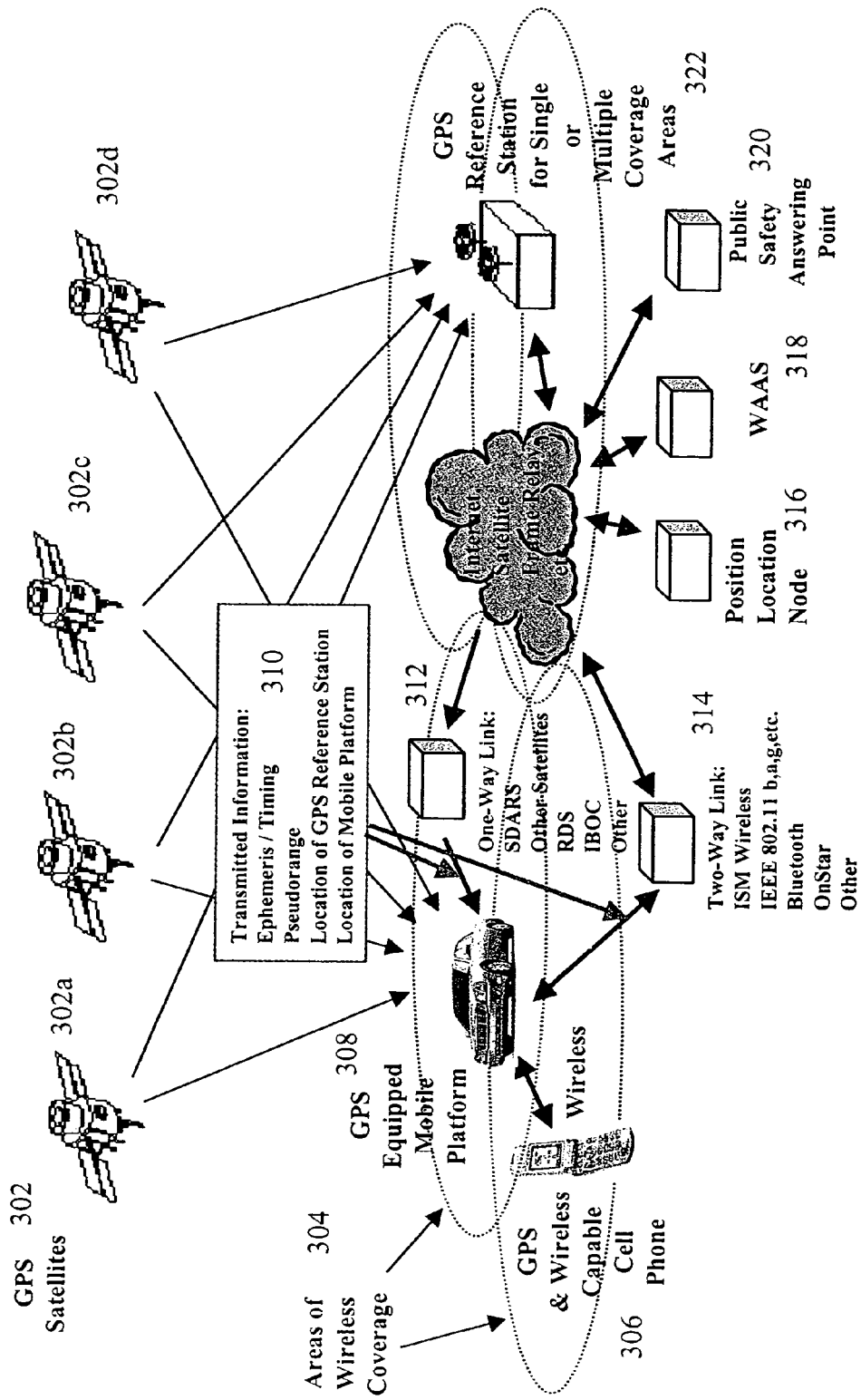
Fig. 3 Ephemeris Assisted GPS Location Block Diagram

METHOD FOR EPHEMERIS ASSISTED GLOBAL POSITIONING

TECHNICAL BACKGROUND

The present invention generally relates to the transmission of global positioning system (GPS) reference information, and more particularly, to transmission of GPS ephemeris information for mobile applications.

BACKGROUND OF THE INVENTION

GPS is a satellite-based global navigation system created and operated by the United States Department of Defense. Originally intended solely to enhance military defense capabilities, GPS capabilities have expanded to provide highly accurate position and timing information for many civilian applications. The system enables receivers or terminals on Earth to gain accurate location information. GPS uses a total of 24 active satellites that have been placed in six different equally spaced orbital planes with four satellites in each. When four satellites are visible, sufficient information is available to be able to calculate the position on Earth.

The satellites transmit signals that are received by the GPS receivers. Each GPS satellite transmits data that includes information about its location and the current time. All GPS satellites synchronize operations so that these repeating signals are transmitted at effectively the same instant. The signals, moving at the speed of light, arrive at a GPS receiver at slightly different times because some satellites are farther away than others. The distance to the GPS satellites can be determined by calculating the time it takes for the signals from the satellites to reach the receiver. When the receiver is able to calculate the distance from at least four GPS satellites, it is possible to determine the position of the GPS receiver in three dimensions. The satellite broadcasts two types of data, Almanac and Ephemeris. Almanac data is course orbital parameters for all satellites. Each satellite broadcasts almanac data for satellites. This almanac data is not very precise and is considered valid for up to several months. Ephemeris data by comparison is very precise orbital and clock correction for each satellite and is necessary for precise positioning. Each satellite broadcasts its own ephemeris data.

GPS receivers use timing signals from at least four satellites to establish a position. Each of those timing signals is going to have some error or delay in reaching Earth. A method used to help correct timing errors is called Differential GPS (D-GPS). D-GPS works by placing a high-performance GPS receiver (reference station) at a known location. Since the terrestrial receiver knows its exact location, it can determine the errors in the satellite signals. It does this by measuring the ranges to each satellite using the signals received and comparing these measured ranges to the actual ranges calculated from its known position. The difference between the measured and calculated range is the total error. The error data for each tracked satellite is formatted into a correction message and transmitted to GPS users.

The United States Coast Guard and other agencies are establishing reference stations in different areas, especially around popular harbors and waterways. A Nationwide Differential Global Positioning System (NDGPS) has been established in the United States. The purpose of the NDGPS is to provide accurate positioning and location information to travelers, emergency response units, and other customers. The reference stations use a low radio frequency broadcast technique that has been used for many years in both maritime and aviation applications to ensure coverage throughout a large geographic area and through obstructions between the broadcast site and the user's equipment. However, a user must be in the area to receive these corrections.

The problem with GPS for mobile applications is that signal levels are low, and the receiver needs to have a direct view of the satellite. This can cause problems when the receiver is used in a building, or even in an urban area where a direct view of the satellite is masked. Additionally the time taken for the receiver to lock—Time To First Fix (TTFF) can be as much as ten minutes or more when the receiver is switched on. Also, the Federal Communications Commission (FCC) has mandated E-911 or Enhanced 911 services requiring cell providers to enable, within their systems or devices, the ability to locate a device within 35 to 50 meters at the time a 911 call is placed from that device. The location information must be provided to the appropriate Public Safety Answering Point (PSAP). The need for reduced TTFF and more accuracy, along with the FCC's mandate, have fueled efforts to improve upon stand-alone GPS.

A-GPS, or Assisted GPS, is a relatively new system that improves the functionality and performance of GPS by integrating the mobile phone network to assist the GPS receiver to overcome the problems associated with TTFF and the low signal levels that are encountered under some situations. A-GPS also works in places where GPS-only technologies do not work well, such as dense urban areas, inside buildings, and in moving cars. Because the hybrid technology uses ranging information from both satellites and a cellular network, the result is precise position location technology that operates in challenging environments where conventional GPS does not operate.

The precise GPS reference information can be obtained from the Wide Area Augmentation System (WAAS). The Federal Aviation Administration (FAA) and the Department of Transportation (DOT) are developing the WAAS program for use in precision flight approaches. Currently, GPS alone does not meet the FAA's navigation requirements for accuracy, integrity, and availability. WAAS corrects for GPS signal errors caused by ionospheric disturbances, timing, and satellite orbit errors, and it provides vital integrity information regarding the health of each GPS satellite. WAAS consists of approximately 25 ground reference stations positioned across the United States that monitor GPS satellite data. Two master stations, located on either coast, collect data from the reference stations and create a GPS correction message. This correction accounts for GPS satellite orbit and clock drift plus signal delays caused by the atmosphere and ionosphere. The corrected differential message is then broadcast through one of two geo-stationary satellites, or satellites with a fixed position over the equator. Although WAAS has not yet been approved for aviation, the system is available for civilian use such as boaters and recreational GPS users.

SUMMARY OF THE INVENTION

The present invention provides a method for the transmission of ephemeris data in assisting a GPS receiver, particularly in an SDAR system. A stand-alone GPS receiver must search for satellite signals and decode the satellite navigation messages before computing its position—tasks which require strong signals and additional processing time. A cellular telephone network can assist a GPS receiver by providing an initial approximate position of the receiver and the decoded satellite ephemeris and clock information. The receiver can therefore utilize weaker signals and also more quickly determine its position. However, cellular coverage is not available in all areas of the United States. Also, A-GPS using the cellular networks would not work in mobile applications where the user does not have a cellular phone. The present invention provides a method of transmitting ephemeris data to assist the GPS receiver in mobile applications without relying on the cellular telephone network.

The present invention provides a method that will help the navigation systems in mobile applications, such as SDAR systems in automobiles, stay on track even if they lose satellite connections in "urban canyons" and tree-shrouded streets. That makes it more likely a driver will actually make the next turn when using the driving directions provided by the GPS receiver. The method increases the capability of a GPS receiver, reducing TTFF while still providing accurate location information at startup. The method also conserves battery power in battery-powered GPS devices over conventional GPS architecture.

When the GPS is initially turned on after being off for a period, it "looks" for satellites based on where it "thinks" it is and based on the almanac and current time. With this information, appropriate satellites can be selected for initial search. When the GPS receiver initially locks onto a satellite, the ephemeris data has yet to be completely collected (or any existing is "stale"). Once the ephemeris data is collected from each satellite in turn, then the data from that satellite is considered valid and available for navigation. If power is cycled off on a GPS receiver, then fairly immediately on, then the ephemeris data is still "fresh", and lock-on will be very quick since the GPS does not have to collect new ephemeris data. This is called a "warm" start. However, if power is cycled off for an extended amount of time, the ephemeris data must be re-collected. This is called a "cold start" and several minutes can elapse before accurate positioning can be calculated.

The present invention provides a method that does not rely on the cellular networks. Today's consumer expects applications to run and respond quickly. Automobile drivers rely on GPS information to be up-to-date and accurate. The difference of a few minutes can result in a driver missing a desired exit off the highway or becoming stuck in stopped traffic. The present invention provides a method unlike other methods used today. The present invention significantly reduces TTFF and provides accurate location information without relying on cellular networks. The method also conserves battery power for battery-powered GPS receivers because the time used to calculate one's present location is reduced. Rather than needing a few minutes during a cold start to determine the location, the present method only takes seconds.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3 is a schematic representation of the Ephemeris Assisted GPS Location Network.

Figure 1:
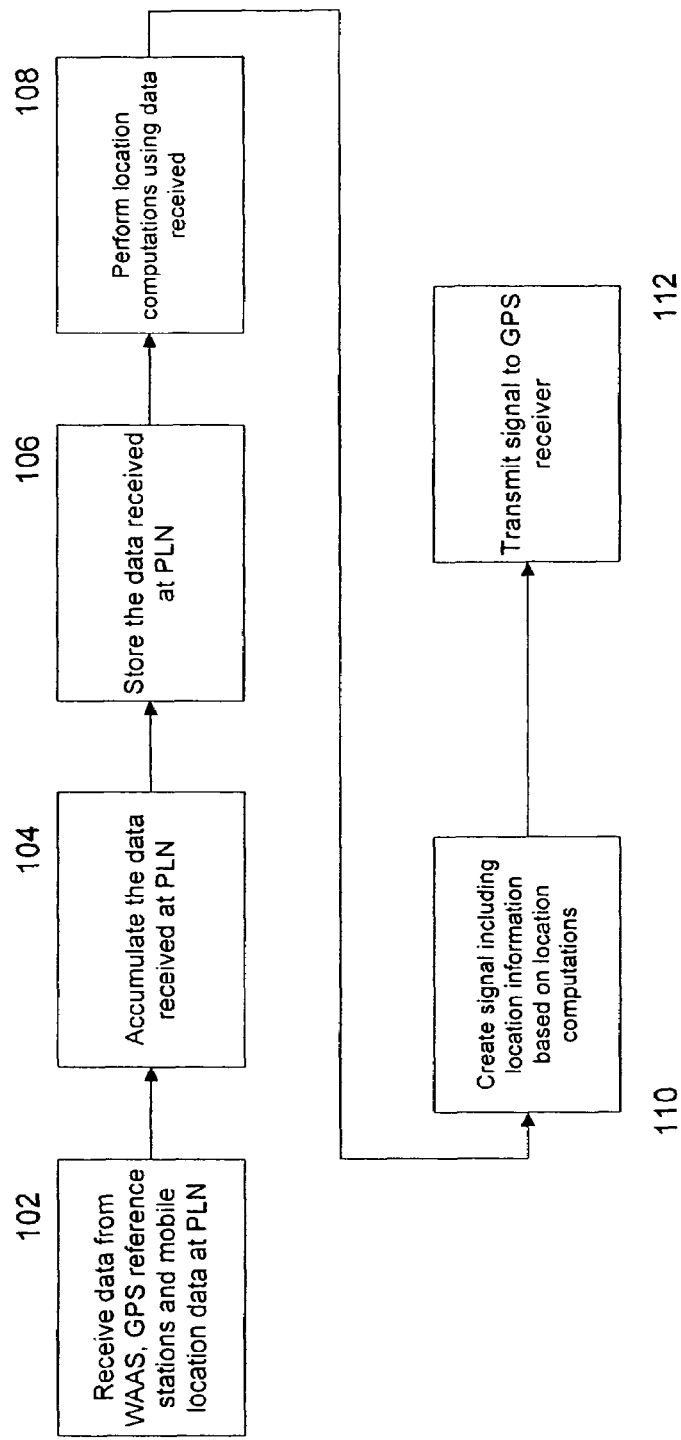
FIG. 1 is a flow chart diagram of the inventive method for receiving.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Ephemeris assisted GPS location network" hereinafter refers to the non-cellular, land-based network used to gather the telemetry word data and compute a location signal, in addition to means and devices used to transmit the location signal to a GPS receiver.

"Ephemeris information" hereinafter refers to navigation message data which contains the ephemeris parameters of the satellite and corrections for satellite clock drift and other minor variations. The complete navigation message consists of 25 frames where each frame is further divided into five subframes. Each subframe contains the precise GPS time at the instant when the first bit of the subframe was transmitted. The first three subframes repeat every frame, containing the clock corrections and health information. The last two subframes vary from frame to frame and contain ionospheric and tropospheric refraction correction parameters and almanac data. The almanac data contains a reduced precision subset of clock and ephemeris data for the whole constellation of satellites, allowing the calculation of rough position of every satellite. The almanac is a curve fit over six days.

"Telemetry Word" hereinafter refers to Word One of each subframe which is composed of an 8-bit preamble used by the GPS receiver to correctly decode the data, 16 bits of data, and a final 6 bits for parity.

"Handover Word" hereinafter refers to Word Two of each subframe which contains 17 bits indicating the time of week according to the satellite's clock when the end of the subframe will be transmitted, known as the Z-count.

"SDARS" hereinafter refers to Satellite Digital Audio Radio Service. In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM"), and 12.5 MHz of which are owned by Sirius Satellite Radio, Inc. of New York City, N.Y. ("Sirius"). Both companies provide subscription-based digital audio that is transmitted form communication satellites, and the services provided by these—and potentially other—companies (i.e., SDAR companies) are capable of being transmitted to both mobile and fixed receivers on the ground.

"RDS" hereinafter refers to Radio Data System. RDS is a system by which useful information can be transmitted to a tuner or receiver. Information available will often include: the station name, an indication as to whether the station broadcasts travel bulletins, an outline of the program currently being broadcast, and the current time. RDS works on the FM waveband only since the RDS information is encoded within the FM signal. RDS is not available on medium wave, long wave or the AM waveband.

"IBOC" hereinafter refers to In Band On Channel. IBOC is a method of transmitting digital and analog radio broadcast signals simultaneously on the same frequency. By utilizing a subcarrier, digital information is "piggybacked" on a normal AM or FM analog signal, thus avoiding any complicated extra frequency assignments. However, by putting extra radio frequency energy toward the edge of the station's channel, interference with adjacent channel stations is increased.

"ISM" hereinafter refers to the Industrial, Scientific, and Medical radio bands. A band is a small spectrum of radio communication frequencies, usually used for the same purpose. ISM were originally reserved internationally for non-commercial use of radio frequency electromagnetic fields for industrial, scientific and medical purposes. In recent years they have also been used for license-free error-tolerant communications applications such as wireless local area networks (LANs) and Bluetooth.

"IEEE 802.11" (or Wi-Fi) hereinafter denotes a set of Wireless LAN standards developed by working group 11 of IEEE 802. The Institute of Electrical and Electronics Engineers (IEEE) is a non-profit, professional organization based in the United States. Its goal is to promote knowledge of electrical engineering. One of its most important roles is in establishing standards for computers formats and devices. The 802.11 family currently includes three separate protocols that focus on encoding (a, b, g).

"Bluetooth" hereinafter refers to a way to connect and exchange information between devices like personal digital assistants (PDAs), cell phones, computers and printers via a secure, low-cost, globally available short-range radio frequency. It is an open specification for short-range communications of data and voice between both mobile and stationary devices.

"OnStar" hereinafter refers to the mobile data package of services designed to provide the consumer with the personal assistance needed while traveling, provided by the OnStar Corp. of Detroit, Mich., which is a subsidiary of General Motors Corporation. With GPS, wireless technologies and specially trained Advisors, OnStar is able to help in almost any emergency. The Safety and Security plan provides allows the subscriber to push a button and connect to an Advisor that can help any time of day or night almost anywhere. The Premium service plan can help with a myriad of daily conveniences including hotel or restaurant reservations, and ATM locations. OnStar services require subscription.

"Mobile Application" hereinafter refers to a GPS receiver in which the GPS receiver is capable of being non-stationary. One embodiment involves a GPS receiver located in an automobile.

Figure 2:
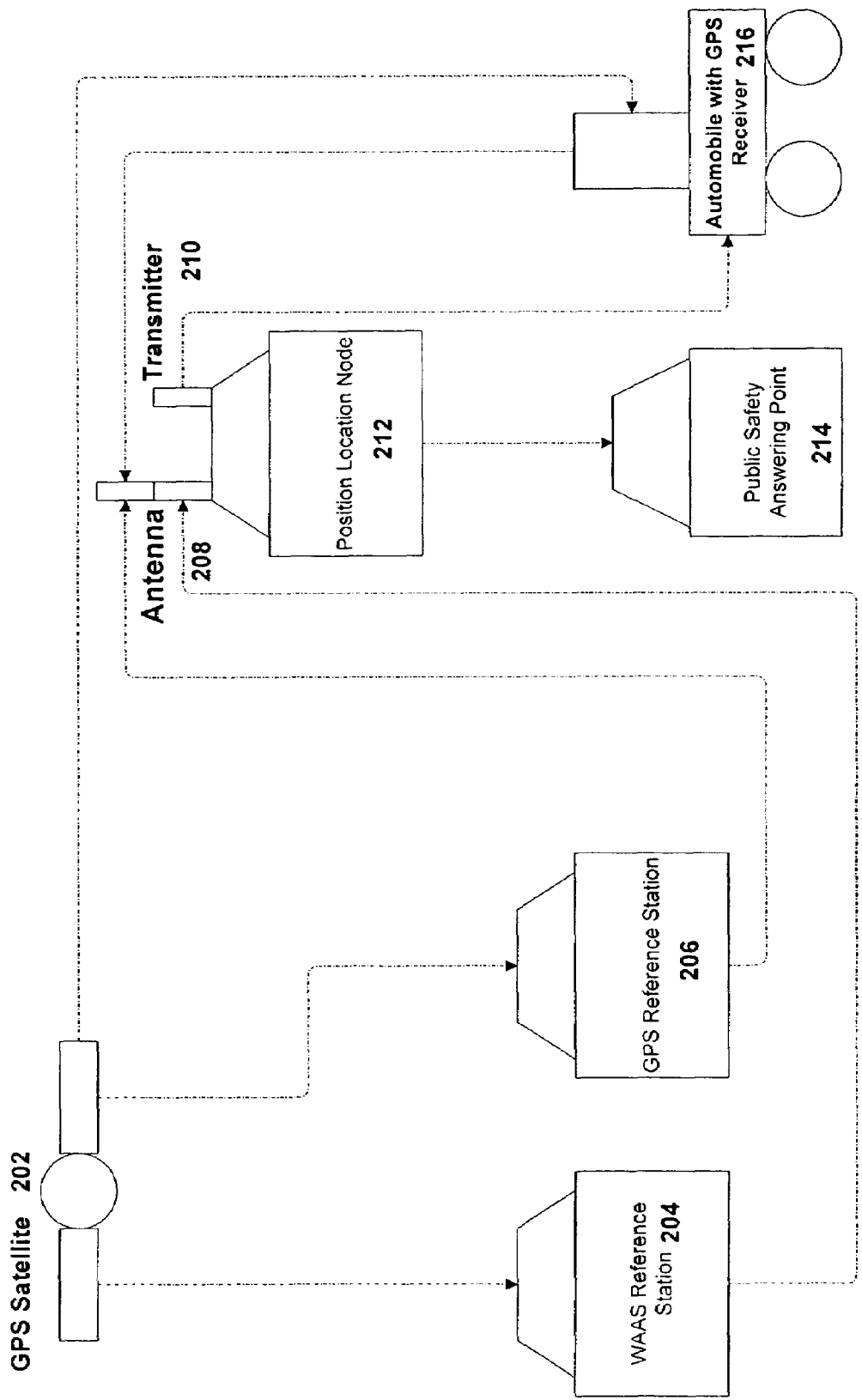
FIG. 2 is a schematic representation of the inventive method for receiving.

For achieving rapid location recognition, the present invention calls for a Position Location Node 212 (PLN) (FIG. 2) capable of receiving data from the Wide Area Augmentation System 204, possibly utilizing an antenna 208. PLN 212 accumulates the data received and stores it in a storage area accessible by PLN 212. PLN 212 uses the data received to perform location computations. PLN 212 then transmits a signal based on the location computations to the GPS receiver. The system uses terrestrial repeaters to receive and re-broadcast the same data that is transmitted by PLN 212.

In another embodiment, PLN 212 also receives GPS Reference Station 206 data. Many areas of the United States are currently not covered by a GPS Reference Station 206. The present invention is capable of using this data, however, where it is available. In this embodiment, the GPS Reference Station data is accumulated along with the WAAS data received from WAAS Reference Station 204. PLN 212 stores the data and performs location computations using the data. PLN 212 then transmits a signal based on the location computations to GPS receiver 216.

In another embodiment, PLN 212 also receives mobile location data from the GPS receiver 216. PLN 212 is capable of receiving such data where information is delivered to GPS receiver 216 in a two-way manner. In this embodiment, the mobile location data is accumulated along with GPS reference data and WAAS data. PLN 212 stores the data and performs location computations. PLN 212 then transmits a signal based on the location computations to GPS receiver 216.

In another form of the invention, PLN 212 is connected to Public Service Access Point 214 (PSAP). The E-911 rules seek to improve the effectiveness and reliability of wireless 911 services by providing 911 dispatchers with additional information on wireless 911 calls. The wireless E911 program is divided into two parts. Phase I requires carriers, upon appropriate request by a local PSAP, to report the telephone number of a wireless 911 caller and the location of the antenna that received the call. Phase II requires wireless carriers to provide far more precise location information, within 50 to 100 meters in most cases. Having PLN 212 adapted to be connected to PSAP 214 allows more precise location information to be reliably transmitted to PSAP 214.

One exemplary form of the present invention is shown in FIG. 3. In the depicted embodiment, a system of transmitting ephemeris data to assist GPS receiver in automobile 308 without relying on the cellular telephone network is disclosed in which PLN 316 receives signals from a non-cellular, land-based network including WAAS 318, GPS Reference Station 322, and mobile location data from GPS equipped mobile platform 308. WAAS 318, GPS Reference Station 322, and mobile location data from GPS equipped mobile platform 308 receive signals from GPS satellites 302. PLN 316 accumulates and stores the telemetry word data that is received. Transmitted information 310 including the telemetry word are transmitted by the non-cellular, land-based network and received by PLN 316. Transmitted information 310 is transmitted via one-way link 312 or two-way link 314. The telemetry word includes navigation message data containing ephemeris parameters of the satellite and corrections for satellite clock drift and other minor variations. PLN 316 is adapted to transmit precise location information to PSAP 320.

The telemetry word data is used by PLN 212 to compute a location signal. The location signal is transmitted to GPS receiver 216. Terrestrial repeaters are used to receive and re-broadcast the same data that is transmitted by PLN 212. The present invention provides a method for providing accurate GPS location information for mobile applications when GPS satellite signal levels are low or GPS receiver 216 does not have a direct view of GPS satellite 202. The present invention further reduces the time taken for GPS receiver 216 to lock—Time To First Fix (TTFF) from as much as ten minutes or more when GPS receiver 216 is switched on conserving battery power in battery-powered GPS devices.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method for transmitting ephemeris assisted location data to a Global Positioning System (GPS) receiver, comprising the steps of:

a. receiving telemetry word data provided by a non-cellular, land-based network, wherein the telemetry data comprises ephemeris parameters with respect to a location of at least one GPS satellite;
b. computing a location signal using data provided by the non-cellular, land-based network, wherein the location signal is based upon the ephemeris parameters, and the location signal is computed prior to the GPS receiver locking with the at least one GPS satellite; and
c. transmitting the location signal to the GPS receiver via a one-way link, such that the GPS receiver locks with the at least one GPS satellite based upon the location signal, wherein the location signal is transmitted to the GPS receiver via a satellite of an ephemeris assisted location network.

2. The method of claim 1 further comprising the step of:
a. accumulating data provided by the non-cellular, land-based network.

3. The method of claim 1 further comprising the step of:
a. storing data provided by the non-cellular, land-based network.

4. The method of claim 1 further comprising the steps of:
a. receiving data provided by a GPS Reference Station;
b. accumulating GPS Reference Station data received;
c. storing GPS Reference Station data; and
d. performing location computations using data received including GPS Reference Station data.

5. The method of claim 1 further comprising the steps of:
a. receiving mobile location data provided by the GPS receiver;
b. accumulating mobile location data received;
c. storing mobile location data; and
d. performing location computations using data received including mobile location data.

6. The method of claim 1 wherein the location signal is transmitted to the GPS receiver via radio delivery service (RDS).

7. The method of claim 1 wherein the location signal is transmitted to the GPS receiver via in band on channel (IBOC) on AM and FM radio stations.

8. The method of claim 1 wherein the location signal is transmitted to the GPS receiver via Industrial, Scientific, and Medical (ISM) radio bands.

9. The method of claim 1 wherein the location signal is transmitted to the GPS receiver via IEEE 802.11 protocol.

10. The method of claim 1 wherein the location signal is transmitted to the GPS receiver via short-range wireless communication technology.

11. The method of claim 1 wherein the location signal is transmitted to the GPS receiver via a mobile data service.

12. The method of claim 1 wherein the location signal is transmitted to the GPS receiver via a satellite wherein the satellite is a Satellite Digital Audio Radio Service (SDARS) satellite.

13. The method of claim 1, wherein the transmitting of the location signal to the GPS receiver reduces the Time To First Fix (TTFF) of the GPS receiver locking to the at least one satellite.

14. The method of claim 13, wherein the TTFF is seconds.

15. The method of claim 1, wherein the computed location signal is not an error correcting location signal that is utilized after the GPS receiver locks with the at least one GPS satellite.

16. The method of claim 1, wherein the data provided by the non-cellular, land-based network comprises almanac data that is used for the computation of the location signal, such that a time period prior to computation of the location signal is reduced.

17. The method of claim 12, wherein the SDARS comprises at least one terrestrial repeater in one-way communication with the GPS receiver.

18. A method for transmitting ephemeris assisted location data to a Global Positioning System (GPS) receiver, comprising the steps of:
a. receiving telemetry word data transmitted by a non-cellular, land-based network, wherein the telemetry word data comprises ephemeris parameters with respect to a location of at least one GPS satellite;
b. computing a location signal using data provided by a non-cellular, land-based network, wherein the location signal is based upon the ephemeris parameters, and the location signal is computed prior to the GPS receiver locking with the at least one GPS satellite; and
c. transmitting the location signal to the GPS receiver via a one-way link comprising a Satellite Digital Audio Radio Service (SDARS) satellite and at least one terrestrial repeater to reduce the Time To First Fix (TTFF), such that the GPS receiver locks with the at least one GPS satellite based upon the location signal.

19. The method of claim 18 further comprising the step of:
a. accumulating data transmitted by the non-cellular, land-based network.

20. The method of claim 18 further comprising the step of:
a. storing data transmitted by the non-cellular, land-based network.

21. The method of claim 18 further comprising the steps of:
a. receiving data transmitted by a GPS Reference Station;
b. accumulating GPS Reference Station data received;
c. storing GPS Reference Station data; and
d. performing location computations using data received including GPS Reference Station data.

22. The method of claim 18 further comprising the steps of:
a. receiving mobile location data transmitted by the GPS receiver;
b. accumulating mobile location data received;
c. storing mobile location data; and
d. performing location computations using data received including mobile location data.

23. The method of claim 18, wherein the TTFF is seconds.

24. The method of claim 18, wherein the computed location signal is not an error correcting location signal that is utilized after the GPS receiver locks with the at least one GPS satellite.

25. The method of claim 18, wherein the data provided by the non-cellular, land-based network comprises almanac data that is used for the computation of the location signal, such that a time period prior to computation of the location signal is reduced.

26. An apparatus for receiving data, said apparatus comprising:
a. a receiver adapted to receive data transmitted from a non-cellular, land-based network, wherein the data comprises ephemeris parameters with respect to at least one GPS satellite;
b. a processor adapted to perform location computations using the data received from non-cellular, land-based network, wherein the location computation is based upon the ephemeris parameters, and the location computation is performed prior to the GPS receiver locking with the at least one GPS satellite; and
c. a GPS receiver that receives the location computations from the processor via a one-way link that comprises a Satellite Digital Audio Radio Service (SDARS) satellite, such that the GPS receiver locks with the at least one GPS satellite based upon the location computation.

27. The apparatus of claim 26 further comprising:
a. an accumulator adapted to accumulate data received from the non-cellular, land-based network.

28. The apparatus of claim 26 further comprising:
a. a database adapted to store data received from the non-cellular, land-based network.

29. The apparatus of claim 26 further comprising:
a. a digital transmission receiver adapted to receive data from a GPS Reference Station;
b. an accumulator adapted to accumulate GPS Reference Station data;
c. a database adapted to store GPS Reference Station Data; and
d. a processor adapted to perform location computations using GPS Reference Station data received.

30. The apparatus of claim 26 further comprising:
a. a digital transmission receiver adapted to receive mobile location data from a GPS receiver;
b. an accumulator adapted to accumulate mobile location information;
c. a database adapted to store mobile location information; and
d. a processor adapted to perform location computations using mobile location data received.

31. The apparatus of claim 26 further comprising means for connecting to a Public Safety Answering Point (PSAP).

32. The apparatus of claim 29, wherein the SDARS comprises at least one terrestrial repeater in one-way communication with the GPS receiver.

33. The apparatus of claim 26, wherein the location computations received by the GPS receiver reduces the TTFF.

34. The apparatus of claim 26, wherein the computed location signal is not an error correcting location signal that is utilized after the GPS receiver locks with the at least one GPS satellite.

35. The method of claim 26, wherein the data received from the non-cellular, land-based network comprises almanac data that is used for the computation of the location signal, such that a time period between the receiver being turned on and the computation of the location signal is reduced.

36. The apparatus of claim 26, wherein the TTFF is seconds.

* * * * *